Nov. 10, 1931.   E. GAIRING   1,831,382
FULL FLOATING UNIVERSAL TOOL HOLDER
Filed July 21, 1930
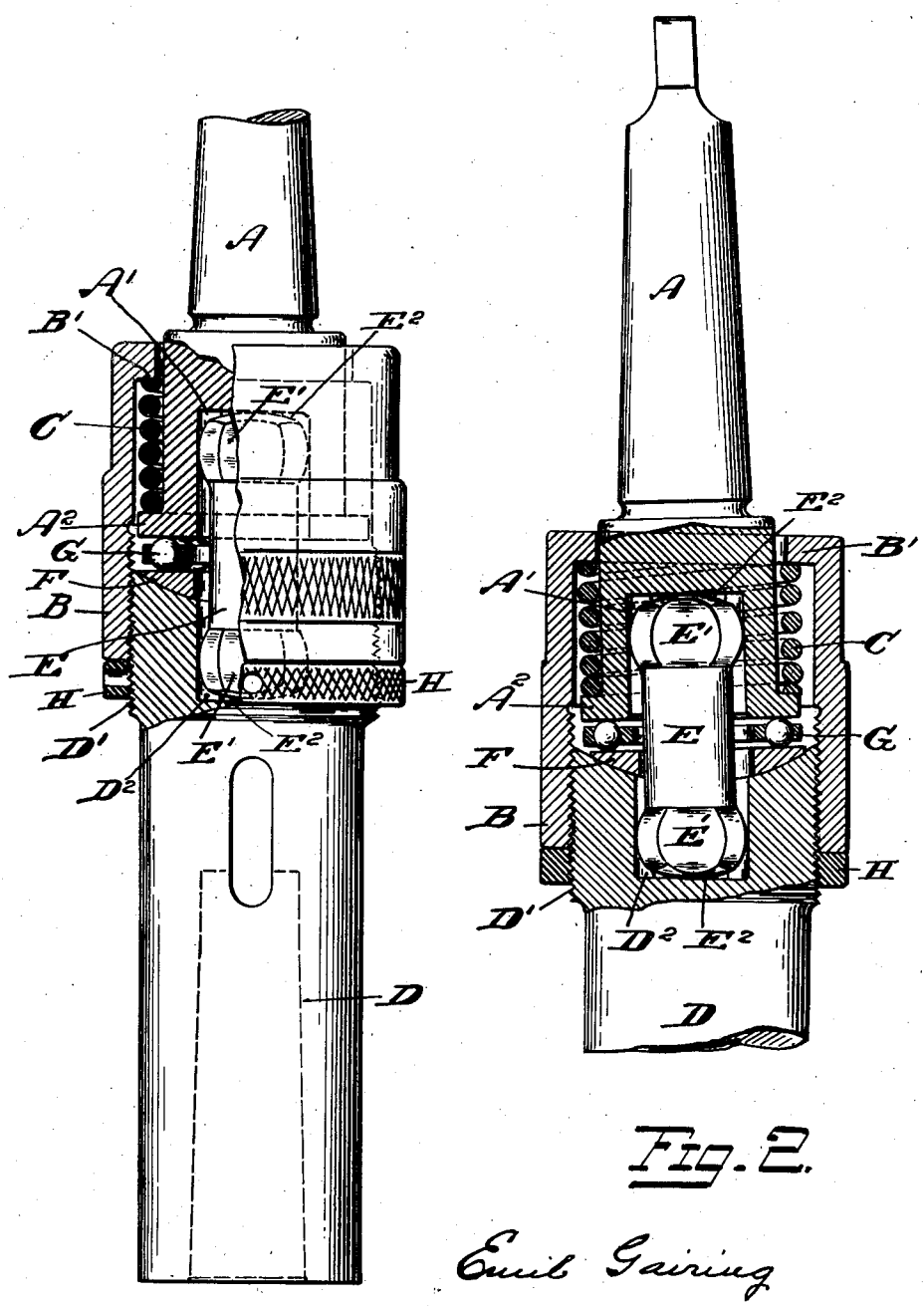
Emil Gairing
INVENTOR
BY S. E. Thomas
ATTORNEY Patented Nov. 10, 1931

1,831,382

UNITED STATES PATENT OFFICE

EMIL GAIRING, OF DETROIT, MICHIGAN, ASSIGNOR TO GAIRING TOOL COMPANY, OF DETROIT, MICHIGAN, A CORPORATION OF MICHIGAN

FULL FLOATING UNIVERSAL TOOL HOLDER

Application filed July 21, 1930. Serial No. 469,421.

This invention relates to a full floating universal drive tool holder for drill presses, turret lathes, boring and other machine tools, shown in the accompanying drawings and more particularly described in the following specification and claim.

The proposed type of floating tool holder automatically permits the tool to align itself with the bushing or work regardless of whether the machine spindle or turret tool holders are off center or are not at right angles to each other, caused by a faulty jig, or by wear or other irregularities.

The driving member or couple is a shaft formed at each end with a hexagonal head which respectively enter hexagonal sockets in the shank member and the tool holder, thus permitting a full floating double universal joint action.

An adjustable collar connects the shank member with the tool holder within which is housed a spring bearing at one end against an overlapping flange of the collar and at the other end against a flange projecting outwardly from the socket of the shank member.

A removable ball race is also employed to provide a thrust bearing between the end wall of the driving socket and the end wall of the tool socket of the holder, and while the latter device is desirable when the tool socket rotates parallel with or on the axis of the machine tool holder, it must be removed if an angular float is required.

The primary object therefore of the present invention is to avoid the removal of the ball thrust bearing when an angular float is required, by providing means whereby the parts may adjust themselves so that the tool socket may automatically shift laterally within predetermined limits, not only while rotating parallel with the axis of the machine tool holder or around its own axis independently of the axis of the latter, but angularly to the axis of the shank of the driving socket and without removing the ball thrust bearing.

To obtain this result a convex disc,—flat on its upper face to receive the balls of the thrust bearing,—is loosely seated in the concave face of the wall surrounding the socket of the tool holder,—the convex disc being free to slide in any direction under the urge of the thrust bearing, thereby automatically adjusting itself so that it may be aligned with the bushing or work regardless of whether the machine spindle or turret tool holders are off center or at right angles to each other,—thus providing a full floating universal joint action, including a ball thrust bearing.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation of a full floating holder with parts broken away and in section.

Figure 2 is a fragmentary elevation and cross-sectional view of the holder, disclosing the convex disc serving to compensate for angular, lateral or other displacements or inaccuracies caused by wear or misalignment of the spindle.

Referring now to the letters of reference placed upon the drawings.

A denotes a tapered shank holder having a driving socket $A^1$ of internal polygonal form in cross-section, with an outwardly projecting flange $A^2$ at the outer end of the socket portion.

B indicates a rotatable screw-threaded collar loosely sleeved upon the socket $A^1$. C is a spring coiled upon the socket $A^1$, bearing at one end against the flange $A^2$ and at the other end against the inwardly directed flange $B^1$ of the collar.

D designates a tool socket with an outwardly projecting screw-threaded portion $D^1$ engaged by the collar B,—connecting the parts together.

E denotes a coupling driving shaft formed at each end with an arc-shaped hexagonal driving head $E^1$, $E^1$ adapted to respectively engage the hexagonal walls of the driving socket $A^1$ at one end of the tapered shank of the tool holder and also the wall of a socket $D^2$ of like form in the upper end of the tool socket D, thereby providing a double universal driving connection between the shank A and the tool socket D of the holder.

The respective sides of the hexagonal driving heads $E^1$, $E^1$ of the shaft E are arc-shaped in longitudinal section and are merged into an arc-shaped end $E^2$, to admit of an universal rocking movement between the tapering shank and the tool socket within predetermined limits, governed by the size of the opening provided in the collar B, in relation to the outer diameter in the socket at the end of the shank.

F denotes a convex disc flat on its upper face, loosely lodged in the concave face of the end wall of the tool socket D of the holder.

G denotes a removable thrust bearing or ball race located between the end wall of the driving socket $A^1$ of the tapering shank and the upper flat surface of the convex disc F, the disc being free to move in any direction in the concave end wall of the tool socket when under the urge of the thrust bearing or ball race. H indicates a lock nut.

It will now be apparent that either a parallel or angular floating action will automatically obtain in relation to the respective axis of the tapering shank and the tool socket of the holder without removing the ball thrust bearing.

The simplicity of the device is evident and as a result of the double action drive,—which serves as a double universal joint, and the compensating convex disc, the tool is adapted to automatically follow without changing, through holes on a true line regardless of the load.

Having thus described my invention, what I claim is:

In an article of the class described, comprising a shank; a tool supporting member; a collar loosely sleeved upon the shank secured to the tool supporting member; universal driving means coupling the shank and the tool supporting member; a spring housed within the collar adapted to maintain the shank and tool supporting member normally in alignment while permitting the tool supporting member to shift within predetermined limits from axial alignment to parallel relation, or at an angle to the axis of the shank, and a ball thrust bearing located at the end of the shank and within the collar; in combination with a convex disc having a flat upper face seated in a concave recess at the end of the tool supporting member and within the collar, whereby it may receive the thrust of the ball thrust bearing and coordinate in the alignment of the tool with the work,—regardless of whether a machine spindle or turret tool holder in collocation therewith is off-center or not.

In testimony whereof, I sign this specification.

EMIL GAIRING.